United States Patent
Ohnuma

[19]
[11] Patent Number: 6,157,149
[45] Date of Patent: Dec. 5, 2000

[54] KINETIC ENERGY REGENERATING DEVICE FOR AN ELECTRIC MOTOR BICYCLE

[75] Inventor: Nobuhito Ohnuma, Shizuoka, Japan

[73] Assignee: Tokyo R&D Co., Ltd., Tokyo, Japan

[21] Appl. No.: 09/397,930

[22] Filed: Sep. 17, 1999

[51] Int. Cl.[7] .............................. H02P 3/14; B62M 23/02
[52] U.S. Cl. ...................... 318/139; 318/376; 318/140; 180/220; 180/206; 180/207
[58] Field of Search ..................... 318/139, 452, 318/140–149, 370–379; 180/205–220, 274, 284, 65.8, 65.6, 65.2; 475/2, 5, 9; 280/214, 288.4, 230

[56] References Cited

U.S. PATENT DOCUMENTS

| | | | |
|---|---|---|---|
| 4,030,562 | 6/1977 | Leighton et al. | 180/34 |
| 4,637,274 | 1/1987 | Goldenfeld | 74/625 |
| 5,341,892 | 8/1994 | Hirose et al. | 180/220 |
| 5,370,200 | 12/1994 | Takata | 180/206 |
| 5,375,676 | 12/1994 | Takata et al. | 180/206 |
| 5,474,148 | 12/1995 | Takata | 180/206 |
| 5,512,022 | 4/1996 | Suzuki | 475/2 |
| 5,664,636 | 9/1997 | Ikuma et al. | 180/206 |
| 5,721,473 | 2/1998 | DeVries | 318/139 |
| 6,012,538 | 1/2000 | Sonobe et al. | 180/220 |
| 6,039,137 | 3/2000 | Schless | 180/220 |

*Primary Examiner*—Paul Ip
*Attorney, Agent, or Firm*—Sughrue, Mion, Zinn, Macpeak & Seas, PLLC

[57] ABSTRACT

A kinetic energy regenerating device for an electric motor bicycle by using an electric motor for rear wheel driving and is utilized as a dynamo. An objective of the present invention is achieved by a kinetic energy regenerating device by using an electric motor for an electric motor bicycle, a driving force of the electric motor rotates a rear wheel hub placed on a same axle of a rear axle sprocket through a chain and the rear axle sprocket engaging the chain, the kinetic energy regenerating device comprising: a first driving force transmission element rotates together with the rear wheel hub, and a second driving force transmission element driven by the first driving force transmission element, and an idler sprocket engaging with the chain and driven by rotation of the second driving force transmission element; and at a time of regenerating kinetic energy, rotation of the rear wheel hub makes the chain drive cyclically through the first driving force transmission element, the second driving force transmission element and the idler sprocket, the electric motor incorporated with the chain regenerates the kinetic energy.

17 Claims, 2 Drawing Sheets

KINETIC ENERGY REGENERATING DEVICE FOR AN ELECTRIC MOTOR BICYCLE

BACKGROUND OF THE INVENTION

The present invention relates to a kinetic energy regenerating device for an electric motor bicycle by using an electric motor including an electric motor power assist bicycle that performs the deducting from pedaling force of a bicycle rider.

In recent years, an electric motor bicycle has been developed and produced. It contributes a role of deduction from a pedaling force on slope.

Such an electric motor bicycle comprises following structures. An electric motor and a pedaling force sensor are connected to a pedal axle. The pedaling force sensor detects the pedaling force of the rider. A control section that receives a detecting signal from the pedaling force sensor controls the electric motor to output torque force corresponding to the rider pedaling force. Consequently, combined force of the rider pedaling force and the motor driving force drives a rear wheel to rotate through a chain.

A part of or most of kinetic energy is wasted as a heat consuming at the time of running down the slope, decelerating and stopping. Therefore a regenerating art of converting the kinetic energy to electric energy is being studied. The art, concretely, is to convert the kinetic energy to the electric energy accumulating in a battery cell. The accumulated electric energy is used for climbing up slope and so on.

However, adopting the art raises following problems.

That is, a same type of hub as an ordinary bicycle is provided on the rear wheel axle. However, the hub internally provides a gearbox or not. Anyway the hub only transmits driving force in one way direction with an internally constituted ratchet mechanism. This means that a free wheel function is provided. Furthermore, a chain transmits a driving force to the rear wheel but not reverse direction. Reverse driving force from the rear wheel is not transmitted to sprockets engaging the chain by the hub. This is occasionally an advantageous point. For example, inertial running is able to prolong a running distance. However, this is disadvantageous point to realize the kinetic energy regenerating device. Furthermore, the electric motor provided in the electric motor bicycle is not available. This is needless to say because the chain is not able to drive the electric motor in reverse.

Therefore, to realize the regenerating of the kinetic energy requires two sets of chain, first set of chain which transmits rider's pedaling force and second set of chain which transmits driving force of the electric motor. However this is not effective.

Although the regenerating art of the kinetic energy is eagerly expected to realize for reason of showing high effectiveness in prolonging cruising distance of the electric motor bicycle. Especially in view point of cutting down manufacturing cost, a regenerating device which the electric motor is able to use as a dynamo, in addition, an existing rear wheel hub of bicycle is able to use as it is, is strongly expected.

SUMMARY OF THE INVENTION

The task of the present invention is to solve the above mentioned problems by offering a regenerating device of kinetic energy for an electric motor bicycle that an electric motor for rear wheel driving is utilized as a dynamo. Moreover, in addition, the objective of the invention is to offer a regenerating device of kinetic energy that can be used a rear wheel hub as it is of a bicycle.

The objective of the present invention is achieved by a kinetic energy regenerating device for an electric motor bicycle by using an electric motor, wherein driving force of the electric motor rotates a rear wheel hub placed on a same axle of a rear axle sprocket through a chain and the rear axle sprocket engaging the chain, the kinetic energy regenerating device comprising:

a first driving force transmission element being fixed to the rear wheel hub and rotating with the rear wheel hub incorporated;

a second driving force transmission element being made to be driven by rotation of the first driving force transmission element; and an idler sprocket being driven by rotation of the second driving force transmission element and being engaged the chain, wherein at a time of regenerating kinetic energy, rotation of the rear wheel hub makes the chain drive cyclically through the first driving force transmission element, the second driving force transmission element and the idler sprocket, the electric motor incorporated with the chain regenerates kinetic energy.

For the first driving force transmission element and the second driving force transmission element, gears engaging each other can be used, in another way pulleys connected by an endless belt can be used.

Moreover, the idler sprocket can be contacted to the chain with pressing for giving tension. That is, the idler sprocket can be used as a tensioner for the chain.

In case of the first driving force transmission element and the second driving force transmission element are gears engaging each other, the idler sprocket can be placed so as to be contacted to lower side of the chain from under. Also the idler sprocket can be placed so as to be contacted to upper side of the chain from upper.

On the other hand in case of the first driving force transmission element and the second driving force transmission element are pulleys connected by an endless belt, the idler sprocket can be placed so as to be contacted to lower side of the chain from upper. Also the idler sprocket can be placed so as to be contacted to upper side of the chain from under.

And also in the present invention, it is suitable to comprise like that a first one-way clutch is placed between the second driving force transmission element and the idler sprocket, driving force can be transmitted from the second driving force transmission element to the idler sprocket but not to be transmitted from the idler sprocket to the second driving force transmission element. Furthermore structuring such cases, it is suitable to comprise like that rotation speed of the idler sprocket, that is rotated by cyclical driving of the chain, is to be faster rotation speed than that of the second driving force transmission element that is rotated by the first driving force transmission element. Especially in case of the rear wheel hub has a gearbox inside, it is desirable to design to satisfy above conditions when the highest gear ratio is selected (the highest gear ratio implies number of rotation of the rear hub becomes most at per rotation of the rear axle sprocket). In this connection, adopting such structure is suitable because an ordinary running should be smoothly performed and also smooth motion should be realized at kinetic energy regenerating.

In case of the first one-way clutch is placed between the second driving force transmission element and the idler sprocket, furthermore, it is suitable to place a clutch for move-back between the idler sprocket and the first one-way clutch, and having the clutch for move-back place in state of no transmission of the driving force can make the idler sprocket rotate freely at moving back. In another way, the clutch for move-back is placed between the first one-way clutch and the second driving force transmission element, and having the clutch for move-back place in state of no transmission of the driving force can make the idler sprocket rotate freely at moving back. Adopting such structure can make moving back smoothly.

Moreover, for mentioning the electric motor bicycle of the present invention comprising:

- a pedal for converting rider's pedaling force to rear wheel driving force;
- a pedal axle sprocket engaging the chain; and
- a second one-way clutch for transmitting driving force only from a rotating axle of the pedal to the pedal axle sprocket, and being intervened between the rotating axle of the pedal and the pedal axle sprocket.

In case of mentioning such electric motor bicycle, the electric motor is connected to the pedal axle sprocket through:

- a third one-way clutch for transmitting driving force only from the electric motor to the pedal axle sprocket; and
- a driving force disconnect/connect clutch for transmitting driving force from the pedal axle sprocket to the electric motor only at regenerating kinetic energy.

Now, furthermore the objective of the present invention is achieved by a kinetic energy regenerating device for an electric motor bicycle by using an electric motor, wherein driving force of the electric motor rotates a rear wheel hub placed on a same axle of a rear axle sprocket through a chain and the rear axle sprocket engaging the chain, the kinetic energy regenerating device comprising:

- a first gear being fixed to periphery of the rear wheel hub, and rotating with the rear wheel hub incorporated;
- a second gear engaging the first gear, and being made to be rotated by rotation of the first gear;
- an idler sprocket being made to be rotated by rotation of the second gear, and being engaged the chain,
  wherein at a time of regenerating kinetic energy, rotation of the rear wheel hub makes the chain drive cyclically through the first gear, the second gear and the idler sprocket, the electric motor incorporated with the chain regenerates kinetic energy.

Moreover the objective of the present invention is achieved by a kinetic energy regenerating device for an electric motor bicycle by using an electric motor, wherein driving force of the electric motor rotates a rear wheel hub placed on a same axle of a rear axle sprocket through a chain and the rear axle sprocket engaging the chain, the kinetic energy regenerating device comprising:

- a first gear being fixed to periphery of the rear wheel hub, and rotating with the rear wheel hub incorporated;
- a second gear engaging the first gear, and being made to be rotated by rotation of the first gear;
- an idler sprocket being made to be rotated by rotation of the second gear, and being engaged the chain,
  wherein at a time of regenerating kinetic energy, rotation of the rear wheel hub makes the chain drive cyclically through i:he first gear, the second gear and the idler sprocket, the electric motor incorporated with the chain regenerates kinetic energy, furthermore, the electric motor bicycle comprising:

- a pedal for converting rider's pedaling force to rear wheel driving force;
- a pedal axle sprocket engaging the chain; and
- a second one-way clutch for transmitting driving force only from a rotating axle of the pedal to the pedal axle sprocket, and being intervened between the rotating axle of the pedal and the pedal axle sprocket.

Furthermore the objective of the present invention is achieved by a kinetic energy regenerating device for an electric motor bicycle by using an electric motor, wherein driving force of the electric motor rotates a rear wheel hub placed on a same axle of a rear axle sprocket through a chain and the rear axle sprocket engaging the chain, the kinetic energy regenerating device comprising:

- a first gear being fixed to periphery of the rear wheel hub, and rotating with the rear wheel hub incorporated;
- a second gear engaging the first gear, and being made to be rotated by rotation of the first gear;
- an idler sprocket being made to be rotated by rotation of the second gear, and being engaged the chain,
  wherein at a time of regenerating kinetic energy, rotation of the rear wheel hub makes the chain drive cyclically through the first gear, the second gear and the idler sprocket, the electric motor incorporated with the chain regenerates kinetic energy, furthermore, the electric motor bicycle comprising:

- a pedal for converting rider's pedaling force to rear wheel driving force;
- a pedal axle sprocket engaging the chain; and
- a second one-way clutch for transmitting driving force only from a rotating axle of the pedal to the pedal axle sprocket, and being intervened between the rotating axle of the pedal and the pedal axle sprocket,
  wherein the electric motor is connected to the pedal axle sprocket through:
- a third one-way clutch for transmitting driving force only from the electric motor to the pedal axle sprocket; and
- a driving force disconnect/connect clutch for transmitting driving force from the pedal axle sprocket to the electric motor only at regenerating kinetic energy.

Anyway as above described, the kinetic energy regenerating device for the electric motor bicycle of the present invention is comprised of structures with following featured requirements a) to c):

a) a first driving force transmission element fixed to a rear wheel hub and rotating together with the rear wheel hub;

b) a second driving force transmission element driven by rotation of the first driving force transmission element; and c) an idler sprocket driven by rotation of the second driving force transmission element and engaging the chain.

Therefore, at the time of regenerating kinetic energy, rotation of the rear wheel hub makes the chain drive cyclically through the first driving force transmission element, the second driving force transmission element and the idler sprocket. As a result of this, the electric motor incorporated with the chain functions as a dynamo and regenerates the kinetic energy. In other words, the kinetic energy regenerating device regarding the present invention is able to drive the electric motor in reverse direction with a chain. Especially, an existing rear wheel hub of bicycle is used as it is can drive the electric motor in reverse direction. Thus, the kinetic energy regenerating device regarding the present invention can utilize an electric motor for rear wheel driving as a dynamo. Furthermore, an existing rear wheel hub of bicycle is available as it is, this results in to realize regenerating the kinetic energy using an existing inexpensive rear wheel hub without developing a special one, and this brings in cutting cost of the kinetic energy regenerating device.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
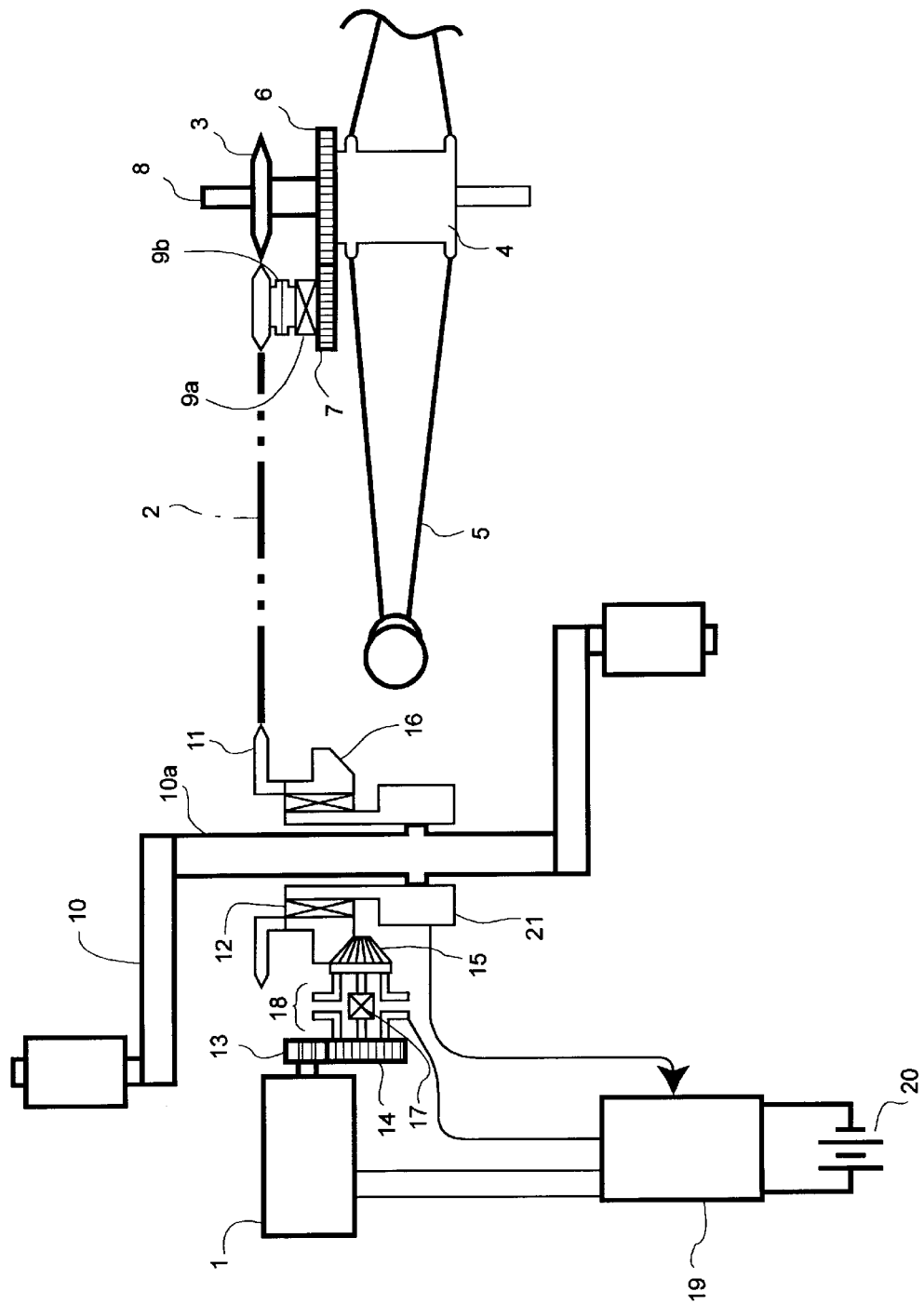
FIG. 1 is an outline structural drawing illustrating a kinetic energy regenerating device for an electric motor cycle according to embodiment of the present invention.
Figure 2:
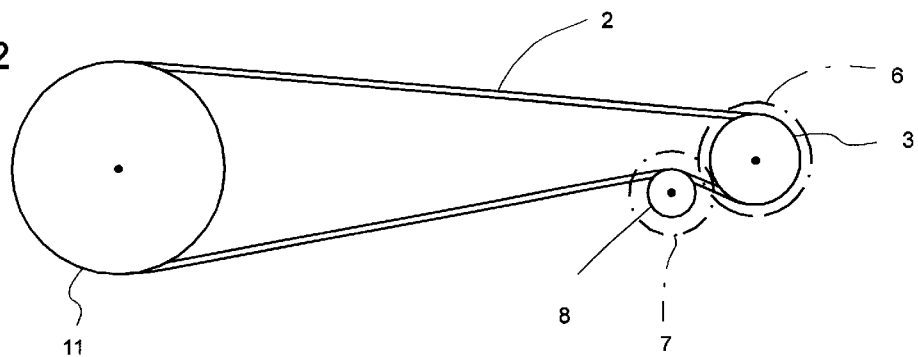
FIG. 2 is a side view of position relationship of each rocket according to embodiment of the present invention.
Figure 3:
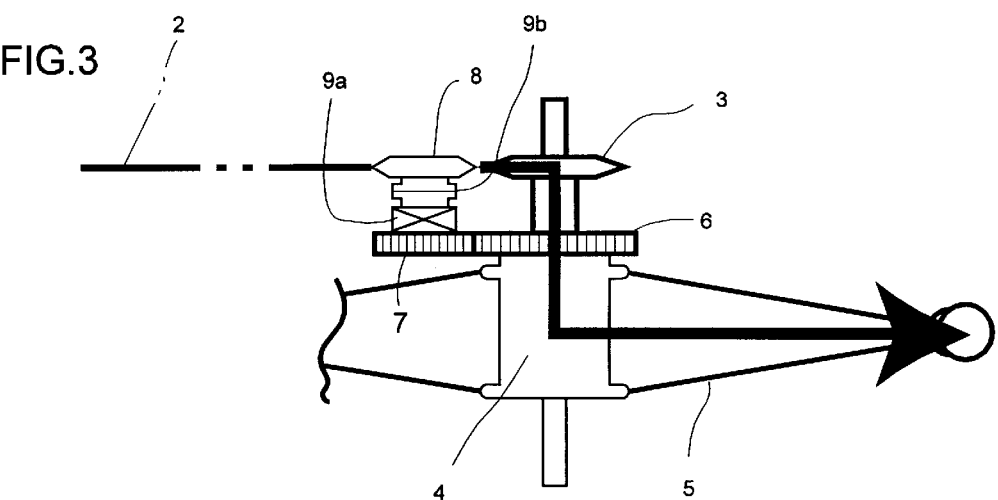
FIG. 3 is an outline drawing illustrating a driving force transmission path at usual running according to embodiment of the present invention.
Figure 4:
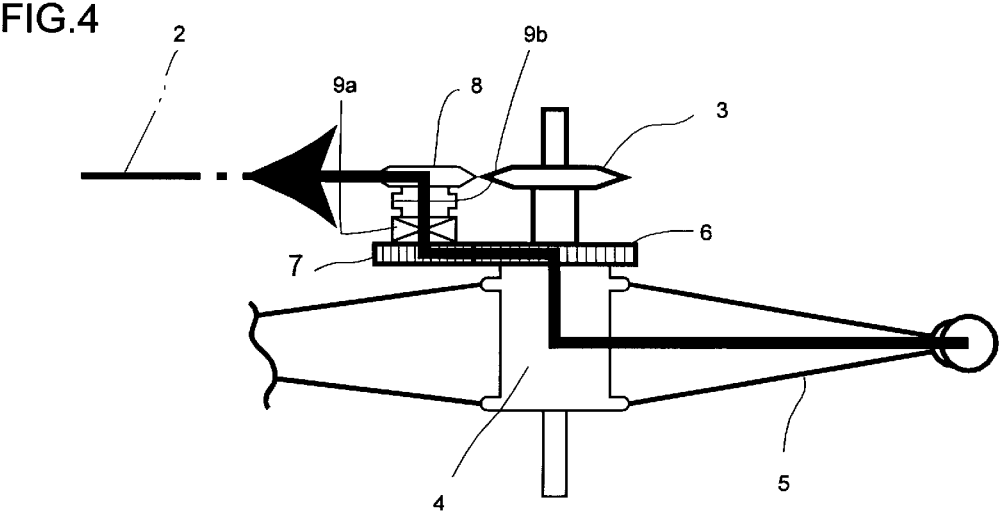
FIG. 4 is an outline drawing illustrating a reverse driving force transmission path at regenerating kinetic energy according to embodiment of the present invention.

Embodiments of the present invention will be described below in detail with reference to the FIGS. 1 to 4. FIG. 1 shows the outline structural drawing illustrating a kinetic energy regenerating device for an electric motor bicycle according to embodiment of the present invention. FIG. 2 shows the side view of position relationship of each sprocket according to embodiment of the present invention. FIG. 3 shows the outline drawing illustrating a driving force transmission path at usual running according to embodiment of the present invention. FIG. 4 shows the outline drawing illustrating a reverse driving force transmission path at regenerating kinetic energy according to embodiment of the present invention.

In addition, exactly the kinetic energy regenerating device explained in followings is for purpose of an electric motor assist bicycle, that is the embodiment of the art of the present invention applied to a bicycle of which power is from mainly rider's pedaling force. No need to say, the art of the present invention can also apply to the complete electric motor bicycle, of which power is from the electric motor, as well as mentioned electric motor assist bicycle.

A structure of the kinetic energy regenerating device (hereafter-called the regenerating device) regarding the embodiments of the present invention is described by using FIG. 1 and FIG. 2.

The present regenerating device shows that the electric motor, which is source of the power, is used as a regenerating dynamo for the electric motor bicycle as above mentioned. In FIG. 1, numeric 1 is an electric motor. The electric motor bicycle that is the objective of the embodiment uses the electric motor 1 as the source of the power. A driving force of electric motor 1 makes rear wheel hub 4 rotate through a chain 2 and a rear axle sprocket 3 engaging the chain 2. Furthermore the rear wheel hub 4 exists on the same axle of the rear axle sprocket 3. Of course the rear wheel hub 4 is a manufactured goods. In other words, the rear wheel hub 4 is able to transmit a driving force from rear axle sprocket 3 to rear wheel 5 but not reverse direction.

The present regenerating device is comprising principal elements of first driving force transmission element 6, second driving force transmission element 7 and idler sprocket 8.

The first driving force transmission element 6 is a ring shaped gear fixed to a periphery of the rear wheel hub 4. Therefore, the first driving force transmission element 6 rotates incorporated with the rear wheel hub 4. On the other hand, the second driving force transmission element 7 is supported by a frame of the electric motor bicycle but not illustrated here. This second driving force transmission element 7 is also a gear which is engaging above mentioned first driving force transmission element 6. Consequently the second driving force transmission element 7 is made to be rotated by rotation of the first driving force transmission element 6. Furthermore the idler sprocket 8 exists on the same axle of above mentioned second driving force transmission element 7. And is engaging the chain 2.

In addition, a first one-way clutch 9a is provided between the idler sprocket 8 and the second driving force transmission element 7. Thus the idler sprocket 8 can only transmit the driving force to the chain 2 from the second driving force transmission element 7 but the driving force cannot be transmitted in reverse direction. That means the second driving force transmission element 7 is not made to be rotated by the chain 2. And details will be described later, at the time of regenerating kinetic energy rotation of the rear wheel hub 4 makes the chain 2 drive forcedly cyclically through the first driving force transmission element 6, the second driving force transmission element 7 and the idler sprocket 8. This results in the electric motor 1 incorporating with the chain 2 works as a dynamo so that the kinetic energy can be regenerated.

In the embodiments of the present invention, clutch 9b for move-back is intervened between the idler sprocket 8 and the first one-way clutch 9a. This means the clutch 9b for move-back is connected to the first one-way clutch 9a in series. And having the clutch 9b for move-back place in state of no transmission of the driving force (released state) at moving back can make the idler sprocket 8 rotate freely. Furthermore, a releasing mechanism of the clutch 9b for move-back comprises with mechanical style. In other words, a lever (not illustrated) to operate the clutch releasing mechanism is provided on handlebars of a bicycle (not illustrated), operating the lever can release the clutch 9b for move-back. By the way, such clutch releasing mechanism by the mechanical style is manually operated the clutch 9b for move-back through a cable or link. Instead of this method the clutch 9b for move-back is possible to be operated by means of electrical method. Practically as the clutch 9b for move-back is considered to adopt a solenoid clutch. Furthermore, the clutch 9b for move-back can be placed between the first one-way clutch 9a and the second driving force transmission element 7.

As above mentioned, the first driving force transmission element 6 and the second driving force transmission element 7 are gears engaging each other. Instead of a pair of these gears, a pair of pulleys connected by an endless belt is substitutable.

And also above mentioned idler sprocket 8 is supported on a frame of the electric motor bicycle by not-illustrated adding force means. The idler sprocket 8 is contacted to the chain 2 with pressing. In terms of, the idler sprocket 8 functions as a tensioner of the chain 2.

Furthermore above mentioned idler sprocket 8 referred to FIG. 2 is placed so as to be contacted to lower side of the chain 2 from under. On the other hand the idler sprocket 8 can be placed so as to be contacted to upper side of the chain 2 from upper.

In case of the first driving force transmission element 6 and the second driving force transmission element 7 are pulleys connected by an endless belt, this position relationship is reversed. In this case the idler sprocket 8 is placed so as to be contacted to lower side of the chain 2 from upper, in another method the idler sprocket 8 is placed so as to be contacted to upper side of the chain 2 from under. Because the first driving force transmission element 6 and the second driving force transmission element 7 rotate in the same direction.

In addition to the embodiments of the present invention, the idler sprocket 8 is comprised to rotate faster than the second driving force transmission element 7 at usual running. This means that rotation speed of the idler sprocket 8, that is forcedly rotated by cyclical driving of the chain 2, is comprised to obtain faster rotation speed than that of the second driving force transmission element 7, that is rotated by the first driving force transmission element 6. Practically these structures are realized by selecting gear ratios between the first driving force transmission element 6 and the second driving force transmission element 7, and number of teeth of the rear axle sprocket 3 and the idler sprocket 8. In case of the rear wheel hub 4 has a built-in type gear, the idler sprocket 8 is designed to rotate (idling) in higher speed than the second driving force transmission element 7 when the highest gear ratios are selected.

Next, structures of the electric motor bicycle (hereafter-called present electric motor bicycle) in which the present regenerating device is provided is described especially focusing on regarding the regenerating device.

The present electric motor bicycle originally provides a pedal 10 for converting rider's pedaling force to rear wheel driving force. However, when the present electric motor bicycle is made to be a complete electric motor bicycle, the pedal 10 may not be provided. Also the present electric motor bicycle is equipped with the pedal axle sprocket 11 engaging above mentioned chain 2. The second one-way clutch 12 is placed between a rotating axle 10a of the pedal 10 and the pedal axle sprocket 11. Therefore pedaling force applied to the pedal 10 is transmitted to the pedal axle sprocket 11 but: the driving force is not transmitted in reverse direction.

Furthermore, the electric motor 1 is connected to above mentioned pedal axle sprocket 11 through two sets of gearbox. One set of the gearbox out of the two sets is comprised of a pinion 13 fixing to an output shaft of the electric motor 1 and a gear 14 engaging the pinion 13. Another set of the gearbox provides a function of orthogonal conversion of driving force. That is, the gearbox is comprised of a gear 15 placed on the same axle of the gear 14 and a ring shaped gear 16 engaging the gear 15. In addition, the gear 16 is unified to the pedal axle sprocket 11. Moreover, two kinds of clutches are placed between the gear 14 and the gear 15. One is a third one-way clutch 17 to always connect the gear 14 with the gear 15. Another is a driving force disconnect/connect clutch 18 (solenoid clutch) to connect the gear 14 with the gear 15 in necessary. Practically the third one-way clutch 17 is built in the driving force disconnect/connect clutch 18. The third one-way clutch 17 transmits driving force from the gear 14 to only the gear 15. That is, the driving force is transmitted from the electric motor 1 to only the pedal axle sprocket 11. On the other hand, the driving force disconnect/connect clutch 18 functions (connect) only at a time of regenerating kinetic energy, to connect the gear 14 with the gear 15. As a result, the driving force is possible to be transmitted from a pedal axle sprocket 11 to the electric motor 1. This means the electric motor 1 is connected to the pedal axle sprocket 11 through the third one-way clutch 17 and the driving force disconnect/connect clutch 18.

Furthermore, the present electric motor bicycle also provides followings except above mentioned comprised elements. That is, the electric motor 1 is connected to a control unit 19, a battery 20 is connected to the control unit 19, and also the control unit 19 is connected to above mentioned driving force disconnect/connect clutch 18 and achieves role of controlling the driving force disconnect/connect clutch 18. The control unit 19 is connected to a torque sensor 21 placed around a rotating axle 10a of the pedal 10. This is for detecting a torque of the rotating axle 10a of the pedal 10.

The electric motor bicycle with the regenerating device comprised as above mentioned functions as follows.

At first when running on a plain land, rider's pedaling force given to a pedal 10 is transmitted through a chain 2 from a pedal axle sprocket 11 to a rear axle sprocket 3. At this time, the electric motor bicycle is propelled by this driving force (refer to FIG. 3).

Next, when a larger pedaling force is required when coming to an up-hill road, it is detected by a torque sensor 21. Then a control unit 19 makes an electric motor 1 activated. Then a driving force of the electric motor 1 and a rider's pedaling force are transmitted to a pedal axle sprocket 11 together. Consequently, propelling of the electric motor bicycle gets assisted by the electric motor 1. At this time accumulated electric energy in a battery 20 is consumed. Furthermore, when getting increase of speed except at up-hill road, pedaling force to the pedal 10 requires to get increased. However, the torque sensor 21 always detects variation of pedaling force. So when the pedaling force is increased, driving force matching to the pedaling force is rightly supplied from the electric motor 1. Under situation of the driving force being required from the electric motor 1, the driving force disconnect/connect clutch 18 keeps disconnecting. So that no trouble in running occurs based on reason of resistance in the electric motor 1 and so on.

Next, when regenerating kinetic energy, the present regenerating device functions as followings. To shift to kinetic energy regenerating mode needs somewhat clue. Practically detecting of braking system usage (incorporating with the brake system), getting into running down-hill road and an inertial running can be a trigger.

Anyway when getting into the kinetic energy regenerating mode (hereafter-called merely regenerating mode), at first the driving force disconnect/connect clutch 18 gets into state of connecting. This is different from above mentioned driving force supply path, then reverse driving force from a rear wheel 5 is transmitted to the chain 2 through the first driving force transmission element 6, the second driving force transmission element 7 and the idler sprocket 8 (refer to FIG. 4). This reverse driving force is finally transmitted to the electric motor 1 through the pedal axle sprocket 11 and following a group of gears, and the driving force disconnect/connect clutch 18 in connecting. Consequently, the electric motor 1 functions as a dynamo and regenerates kinetic energy. Then produced electric energy is accumulated in the battery 20.

In addition, as already described in the present embodiment of the present invention, the idler sprocket 8 rotated by cyclical driving of the chain 2 is comprised to rotate faster than the second driving force transmission element 7 rotated by the first driving force transmission element 6 at ordinary running. Therefore, at the time of regenerating kinetic energy when rotation speed of the idler sprocket 8 becomes equally to that of the second driving force transmission element 7, rotation speed of the rear axle sprocket 3 rotated forcedly through the chain 2 by rotation of the idler sprocket 8 does not exceed rotation speed of the rear wheel hub L4. Therefore, no mismatching on operation to free wheel function of the rear wheel hub 14 provided occurs.

Furthermore, the present invention is not limited to above mentioned embodiments, when it is within thinking of the art, embodiments of the art is able to be realized by adding appropriate alteration.

A kinetic energy regenerating device of the present invention, at the time of regenerating kinetic energy, rotation of the rear wheel hub 4 makes the chain 2 drive cyclically through the first driving force transmission element 6, the second driving force transmission element 7 and the idler sprocket 8. The electric motor 1 incorporated with the chain 2 functions as a dynamo and regenerates the kinetic energy. In other words, the kinetic energy regenerating device of the present invention is able to drive the electric motor 1 in reverse direction with a chain 2. Especially, as the rear wheel hub 4, an existing rear wheel hub of bicycle is used as it is can drive the electric motor 1 in reverse direction. Thus, the kinetic energy regenerating device of the present invention can utilize an electric motor 1 for rear wheel driving as a regenerating dynamo. Furthermore, an existing rear wheel hub of bicycle is available as it is. In other words, the present invention is able to realize regenerating the kinetic energy using an existing inexpensive rear wheel hub without developing as a special rear wheel hub 4. As a result, this brings in cutting cost of the kinetic energy regenerating device, moreover cost of the electric motor bicycle itself.

What is claimed is:

1. A kinetic energy regenerating device for an electric motor bicycle by using an electric motor, wherein driving force of said electric motor rotates a rear wheel hub placed on a same axle of a rear axle sprocket through a chain and said rear axle sprocket engaging said chain, said kinetic energy regenerating device comprising:
    a first driving force transmission element being fixed to said rear wheel hub and rotating with said rear wheel hub incorporated;
    a second driving force transmission element being made to be driven by rotation of said first driving force transmission element; and
    an idler sprocket being driven by rotation of said second driving force transmission element and being engaged said chain,
    wherein at a time of regenerating kinetic energy, rotation of said rear wheel hub makes said chain drive cyclically through said first driving force transmission element, said second driving force transmission element and said idler sprocket, said electric motor incorporated with said chain regenerates kinetic energy.

2. A kinetic energy regenerating device for an electric motor bicycle of claim 1, wherein said first driving force transmission element and said second driving force transmission element are gears engaging each other.

3. A kinetic energy regenerating device for an electric motor bicycle of claim 2, wherein said idler sprocket is placed so as to be contacted to lower side of said chain from under.

4. A kinetic energy regenerating device for an electric motor bicycle of claim 2, wherein said idler sprocket is placed so as to be contacted to upper side of said chain from upper.

5. A kinetic energy regenerating device for an electric motor bicycle of claim 1, wherein said first driving force transmission element and said second driving force transmission element are pulleys connected by an endless belt.

6. A kinetic energy regenerating device for an electric motor bicycle of claim 5, wherein said idler sprocket is placed so as to be contacted to lower side of said chain from upper.

7. A kinetic energy regenerating device for an electric motor bicycle of claim 5, wherein said idler sprocket is placed so as to be contacted to upper side of said chain from under.

8. A kinetic energy regenerating device for an electric motor bicycle of claim 1, wherein said idler sprocket is contacted to said chain with pressing for giving tension.

9. A kinetic energy regenerating device for an electric motor bicycle of claim 1 comprising:
    a first one-way clutch is placed between said second driving force transmission element and said idler sprocket,
    wherein driving force can be transmitted from said second driving force transmission element to said idler sprocket but not to be transmitted from said idler sprocket to said second driving force transmission element.

10. A kinetic energy regenerating device for an electric motor bicycle of claim 9, wherein rotation speed of said idler sprocket being rotated by cyclical driving of said chain is to be faster rotation speed than that of said second driving force transmission element that is rotated by said first driving force transmission element.

11. A kinetic energy regenerating device for an electric motor bicycle of claim 9 comprising:
    a clutch for move-back being intervened between said idler sprocket and said first one-way clutch,
    wherein at moving back, said clutch for move-back is forced to be in a state of no transmission of driving force for making said idler sprocket rotate freely.

12. A kinetic energy regenerating device for an electric motor bicycle of claim 9 comprising:
    a clutch for move-back being intervened between said first one-way clutch and said second driving force transmission element,
    wherein at moving back, said clutch for move-back is forced to be in a state of no transmission of driving force for making said idler sprocket rotate freely.

13. A kinetic energy regenerating device for an electric motor bicycle of claim 1, wherein said electric motor bicycle comprising:
    a pedal for converting rider's pedaling force to rear wheel driving force;
    a pedal axle sprocket engaging said chain; and
    a second one-way clutch for transmitting driving force only from a rotating axle of said pedal to said pedal axle sprocket, and being intervened between said rotating axle of said pedal and said pedal axle sprocket.

14. A kinetic energy regenerating device for an electric motor bicycle of claim 13, wherein said electric motor is connected to said pedal axle sprocket through:
    a third one-way clutch for transmitting driving force only from said electric motor to said pedal axle sprocket; and
    a driving force disconnect/connect clutch for transmitting driving force from said pedal axle sprocket to said electric motor only at regenerating kinetic energy.

15. A kinetic energy regenerating device for an electric motor bicycle by using an electric motor, wherein driving force of said electric motor rotates a rear wheel hub placed on a same axle of a rear axle sprocket through a chain and said rear axle sprocket engaging said chain, said kinetic energy regenerating device comprising:

a first gear being fixed to periphery of said rear wheel hub, and rotating with said rear wheel hub incorporated;

a second gear engaging said first gear, and being made to be rotated by rotation of said first gear;

an idler sprocket being made to be rotated by rotation of said second gear, and being engaged said chain, wherein at a time of regenerating kinetic energy, rotation of said rear wheel hub makes said chain drive cyclically through said first gear, said second gear and said idler sprocket, said electric motor incorporated with said chain regenerates kinetic energy.

16. A kinetic energy regenerating device for an electric motor bicycle by using an electric motor, wherein driving force of said electric motor rotates a rear wheel hub placed on a same axle of a rear axle sprocket through a chain and said rear axle sprocket engaging said chain, said kinetic energy regenerating device comprising:

a first gear being fixed to periphery of said rear wheel hub, and rotating with said rear wheel hub incorporated;

a second gear engaging said first gear, and being made to be rotated by rotation of said first gear;

an idler sprocket being made to be rotated by rotation of said second gear, and being engaged said chain, wherein at a time of regenerating kinetic energy, rotation of said rear wheel hub makes said chain drive cyclically through said first gear, said second gear and said idler sprocket, said electric motor incorporated with said chain regenerates kinetic energy, furthermore, said electric motor bicycle comprising:

a pedal for converting rider's pedaling force to rear wheel driving force;

a pedal axle sprocket engaging said chain; and a second one-way clutch for transmitting driving force only from a rotating axle of said pedal to said pedal axle sprocket, and being intervened between said rotating axle of said pedal and said pedal axle sprocket.

17. A kinetic energy regenerating device for an electric motor bicycle by using an electric motor, wherein driving force of said electric motor rotates a rear wheel hub placed on a same axle of a rear axle sprocket through a chain and said rear axle sprocket engaging said chain, said kinetic energy regenerating device comprising:

a first gear being fixed to periphery of said rear wheel hub, and rotating with said rear wheel hub incorporated;

a second gear engaging said first gear, and being made to be rotated by rotation of said first gear;

an idler sprocket being made to be rotated by rotation of said second gear, and being engaged said chain, wherein at a time of regenerating kinetic energy, rotation of said rear wheel hub makes said chain drive cyclically through said first gear, said second gear and said idler sprocket, said electric motor incorporated with said chain regenerates kinetic energy, furthermore, said electric motor bicycle comprising:

a pedal for converting rider's pedaling force to rear wheel driving force;

a pedal axle sprocket engaging said chain; and a second one-way clutch for transmitting driving force only from a rotating axle of said pedal to said pedal axle sprocket, and being intervened between said rotating axle of said pedal and said pedal axle sprocket, wherein said electric motor is connected to said pedal axle sprocket through:

a third one-way clutch for transmitting driving force only from said electric motor to said pedal axle sprocket; and a driving force disconnect/connect clutch for transmitting driving force from said pedal axle sprocket to said electric motor only at regenerating kinetic energy.

* * * * *